US012737450B2

(12) United States Patent
Yan et al.

(10) Patent No.: US 12,737,450 B2
(45) Date of Patent: Sep. 15, 2026

(54) REMOTE ATTESTATION

(71) Applicant: Beijing Volcano Engine Technology Co., Ltd., Beijing (CN)

(72) Inventors: Lu Yan, Beijing (CN); Yao Zhang, Beijing (CN); Ye Wu, Beijing (CN)

(73) Assignee: Beijing Volcano Engine Technology Co., Ltd., Beijing (CN)

( * ) Notice: Subject to any disclaimer, the term of this patent is extended or adjusted under 35 U.S.C. 154(b) by 119 days.

(21) Appl. No.: 18/948,976

(22) Filed: Nov. 15, 2024

(65) Prior Publication Data

US 2025/0156529 A1 May 15, 2025

(30) Foreign Application Priority Data

Nov. 15, 2023 (CN) ........................ 202311523826.1

(51) Int. Cl.
*G06F 21/53* (2013.01)
*G06F 21/44* (2013.01)
(Continued)

(52) U.S. Cl.
CPC ........ *G06F 21/53* (2013.01); *G06F 2221/033* (2013.01)

(58) Field of Classification Search
CPC .... G06F 21/53; G06F 2221/033; G06F 21/57; G06F 21/445; H04L 63/123; H04L 9/40
See application file for complete search history.

(56) References Cited

U.S. PATENT DOCUMENTS 12,126,736 B2 * 10/2024 Moore .................... G06F 21/53
2016/0350534 A1 * 12/2016 Poornachandran ... G06F 21/554
(Continued)

FOREIGN PATENT DOCUMENTS

CN 111988141 A 11/2020
CN 112468473 A 3/2021
(Continued)

OTHER PUBLICATIONS

ISA China National Intellectual Property Administration, International Search Report Issued in Application No. PCT/CN2024/131408, Jan. 9, 2025, WIPO, 5 pages.
(Continued)

*Primary Examiner* — Darren B Schwartz
(74) *Attorney, Agent, or Firm* — Alleman Hall LLP

(57) ABSTRACT

The disclosure provides a remote attestation method, apparatus, electronic device, and storage medium. The method is applied to a first application, and the first application runs in a first trusted execution environment. The method includes: initiating a remote attestation request to a second application, wherein the second application runs in a second trusted execution environment; obtaining a first attestation response returned by the second application; obtaining a first attestation evidence of the second application from a target trusted storage module, wherein the first attestation evidence is uploaded and stored in the target trusted storage module by the second application; and performing remote attestation based on the first attestation response and the first attestation evidence, to obtain a first remote attestation result for the second application.

18 Claims, 3 Drawing Sheets

(51) Int. Cl.

| | |
|---|---|
| ***G06F 21/57*** | (2013.01) |
| ***H04L 9/40*** | (2022.01) |

(56) References Cited

U.S. PATENT DOCUMENTS

| | | | | |
|---|---|---|---|---|
| 2018/0287802 | A1* | 10/2018 | Brickell | H04L 9/006 |
| 2019/0370467 | A1* | 12/2019 | Li | H04L 9/3234 |
| 2020/0106610 | A1* | 4/2020 | Doddavula | H04L 9/0637 |
| 2020/0210585 | A1* | 7/2020 | Thom | G06F 21/71 |
| 2020/0349252 | A1* | 11/2020 | Yu | G06F 21/53 |
| 2021/0266148 | A1* | 8/2021 | Tsirkin | H04L 9/0897 |
| 2021/0303734 | A1* | 9/2021 | Tsirkin | H04L 9/0897 |
| 2021/0397698 | A1* | 12/2021 | Li | H04L 9/3263 |
| 2021/0409222 | A1* | 12/2021 | Moran | H04L 9/3234 |

FOREIGN PATENT DOCUMENTS

| | | | |
|---|---|---|---|
| CN | 112948810 | A | 6/2021 |
| CN | 113221166 | A | 8/2021 |
| CN | 114629639 | A | 6/2022 |
| CN | 116980163 | A | 10/2023 |
| CN | 117061105 | A | 11/2023 |
| CN | 117579331 | A | 2/2024 |
| WO | 2021184968 | A1 | 9/2021 |

OTHER PUBLICATIONS

China National Intellectual Property Administration, Office Action and Search Report Issued in Application No. 202311523826.1, Jun. 19, 2024, 44 pages.

* cited by examiner

PROCESSOR
1010
MEMORY
1020
1050
INPUT/OUTPUT INTERFACE
1030
COMMUNICATION INTERFACE
1040

REMOTE ATTESTATION

CROSS-REFERENCE

The present application claims priority to Chinese Patent Application No. 202311523826.1, filed on Nov. 15, 2023, and entitled "REMOTE ATTESTATION METHOD, APPARATUS, ELECTRONIC DEVICE, AND STORAGE MEDIUM", the entirety of which is incorporated herein by reference.

FIELD

The present disclosure relates to the field of technologies, and in particular, to remote attestation.

BACKGROUND

To implement trusted computing, a computing program is required to run in a trusted execution environment (TEE). The TEE is a security region of a processor, and establishes an isolated execution environment that provides security features, such as isolated execution, integrity of an application running in the TEE, and confidentiality of assets of the application.

To implement communication between a plurality of TEE trusted applications, it is required to verify, by means of remote attestation, that the applications run on secure trusted execution environment platforms and logic of the application programs is not tampered with. However, the existing remote attestation technologies cannot meet the use requirements of the application programs.

SUMMARY

In view of the above, an objective of the present disclosure is to provide a remote attestation method, apparatus, electronic device, and storage medium.

Based on the above objective, a first aspect of the present disclosure provides a remote attestation method, applied to a first application, wherein the first application runs in a first trusted execution environment; and the method comprises: initiating a remote attestation request to a second application, wherein the second application runs in a second trusted execution environment; obtaining a first attestation response returned by the second application; obtaining a first attestation evidence of the second application from a target trusted storage module, wherein the first attestation evidence is uploaded and stored in the target trusted storage module by the second application; and performing remote attestation based on the first attestation response and the first attestation evidence, to obtain a first remote attestation result for the second application.

In some embodiments, the first attestation response comprises a first remote attestation report, and the first remote attestation report is generated based on the remote attestation request.

In some embodiments, the first attestation evidence comprises reference application measurement value information of the second application, and the reference application measurement value information is generated and uploaded to the target trusted storage module based on creation or updating of the second application in the second trusted execution environment.

In some embodiments, the performing remote attestation based on the first attestation response and the first attestation evidence, to obtain a first remote attestation result for the second application comprises: determining whether the first remote attestation report meets a predetermined condition; in response to the first remote attestation report meeting the predetermined condition, obtaining application measurement value information of the second application based on the first remote attestation report, and verifying the reference application measurement value information and the application measurement value information; in response to the reference application measurement value information matching the application measurement value information, determining that the first remote attestation result is that attestation succeeds; and in response to the reference application measurement value information not matching the application measurement value information, determining that the first remote attestation result is that attestation fails.

In some embodiments, before the performing remote attestation based on the first attestation response and the first attestation evidence, the method further comprises: obtaining additional information in the first attestation response; and obtaining first information based on the first remote attestation report, and determining an association relationship between the first remote attestation report and the second application based on the additional information and the first information.

In some embodiments, the method further comprises: obtaining a first verification policy of the first application from a target trusted storage module, wherein the first verification policy is uploaded and stored in the target trusted storage module by the first application, and the first verification policy is used for remote attestation of the first application to another application, and the another application comprises the second application; and the performing remote attestation based on the first attestation response and the first attestation evidence comprises: verifying the first attestation response and the first attestation evidence based on the first verification policy.

In some embodiments, the method further comprises: setting a attestation service in a smart contract of the target trusted storage module; and the verifying the first attestation response and the first attestation evidence based on the first verification policy comprises: verifying the first attestation response and the first attestation evidence based on the first verification policy by the smart contract.

In some embodiments, the first attestation evidence comprises at least one of the following: application identification information of the second application; application version information of the second application;

at least one remote attestation type of the second application; or at least one piece of application measurement value information of the second application, wherein the application measurement value information is associated with the remote attestation type.

In some embodiments, in response to the first remote attestation result being that attestation succeeds, the method further comprises: generating a second attestation response and sending the second attestation response to the second application, to cause the second application to perform the following steps: obtaining second attestation evidence of the first application from a target trusted storage module, wherein the second attestation evidence is uploaded and stored in the target trusted storage module by the first application; and performing remote attestation based on the second attestation response and the second attestation evidence, to obtain a second remote attestation result for the first application.

In some embodiments, in response to the second remote attestation result being that attestation succeeds, the method further comprises: obtaining a public key of the second application, generating a first session key based on a private key of the first application and the public key of the second application, and communicating with the second application based on the first session key; and causing the second application to obtain a public key of the first application, generating a second session key based on a private key of the second application and the public key of the first application, and communicating with the first application based on the second session key; wherein the first session key is the same as the second session key.

In some embodiments, the method further comprises: in response to the first application and/or the second application being an open-source application, uploading and storing application code of the first application and/or the second application to a public address.

A second aspect of the present disclosure provides a remote attestation apparatus, comprising a first application, wherein the first application runs in a first trusted execution environment, and the apparatus further comprises: a request module configured to: initiate a remote attestation request to a second application, wherein the second application runs in a second trusted execution environment; a return module configured to: obtain a first attestation response returned by the second application; an obtaining module configured to: obtain a first attestation evidence of the second application from a target trusted storage module, wherein the first attestation evidence is uploaded and stored in the target trusted storage module by the second application; and an attestation module configured to: perform remote attestation based on the first attestation response and the first attestation evidence, to obtain a first remote attestation result for the second application.

A third aspect of the present disclosure provides an electronic device, comprising a memory, a processor, and a computer program stored on the memory and executable on the processor, wherein the processor implements the remote attestation method according to the first aspect when executing the program.

A fourth aspect of the present disclosure provides a non-transitory computer-readable storage medium storing computer instructions, wherein the computer instructions are configured to cause a computer to execute the remote attestation method according to the first aspect.

It can be seen from the above that in the remote attestation method, apparatus, electronic device, and storage medium provided in the present disclosure, the second application uploads, in advance, the first attestation evidence that is used as a remote attestation reference value of the second application to the target trusted storage module, so that when the first application needs to perform remote attestation for the second application, the first application can directly obtain, from the target trusted storage module, the first attestation evidence that is used as the reference value, and perform the remote attestation in combination with the first attestation response that is directly obtained from the second application by initiating the remote attestation request, to obtain a final remote attestation result. In this process, because the first attestation evidence that is used as the reference value is stored in the target trusted storage module instead of the first application, the attestation evidence of the first application does not change, and subsequent remote attestation of the first application is not affected, that is, there is no need to worry about the circular dependency problem caused by two-way attestation. Meanwhile, because the first attestation evidence is uploaded and stored in the target trusted storage module, when the second application is a new application or the second application is updated, it is only required to obtain the attestation evidence of the new version of the second application and upload and store the attestation evidence to the target trusted storage module. When the first application initiates the remote attestation request to the second application, the first application obtains, from the target trusted storage module, the first attestation evidence corresponding to the latest version of the second application as the reference value for remote attestation. In this way, remote attestation between applications can be implemented even when a new application is added or an application is updated.

BRIEF DESCRIPTION OF THE DRAWINGS

In order to more clearly describe the technical solutions in the present disclosure or the related art, the following briefly describes the accompanying drawings required for describing the embodiments or the related art. Apparently, the accompanying drawings in the following description show merely some embodiments of the present disclosure, and a person of ordinary skill in the art may still derive other drawings from these accompanying drawings without creative efforts.

DETAILED DESCRIPTION

Figure 1:
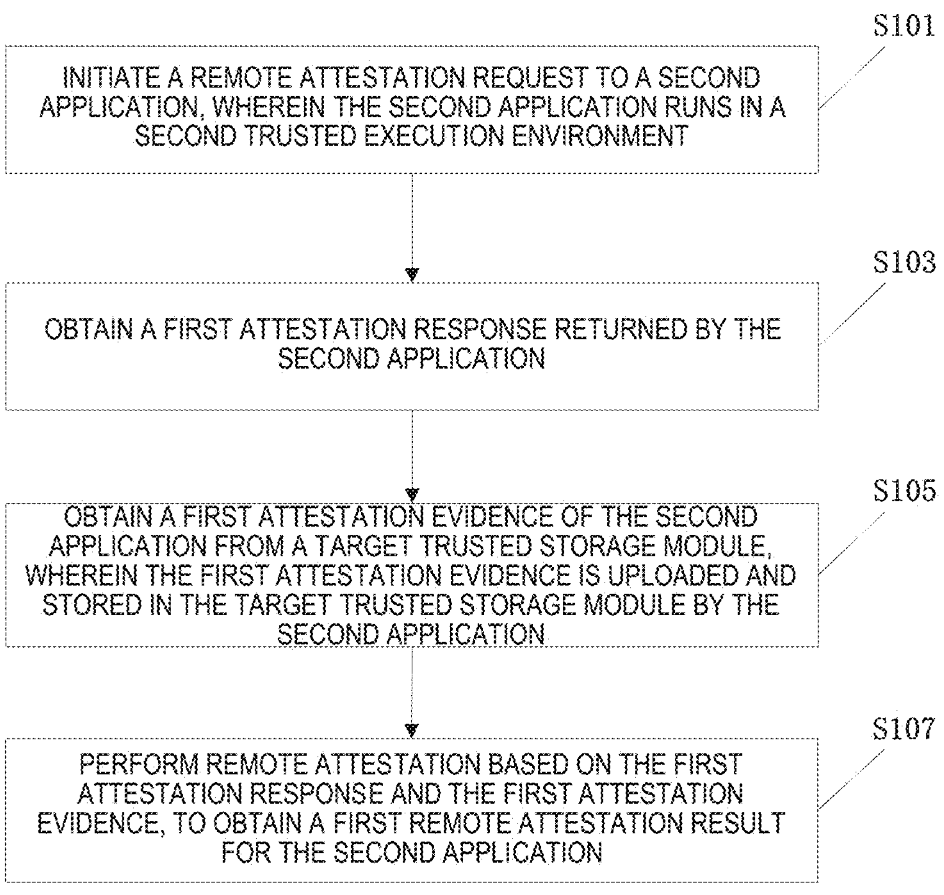
FIG. 1 is a schematic flowchart of an exemplary method according to an embodiment of the present disclosure.

To make the objectives, technical solutions, and advantages of the present disclosure clearer, the present disclosure is further described in detail below with reference to specific embodiments and the accompanying drawings.

It should be noted that unless otherwise defined, the technical term or scientific term used in the embodiments of the present disclosure shall have the ordinary meaning understood by a person of ordinary skill in the art to which the present disclosure pertains. The "first", "second", and similar words used in the embodiments of the present disclosure do not denote any order, quantity, or importance, but are merely used to distinguish different components. The similar words such as "include" or "have" mean that an element or object preceding the word covers an element or object listed after the word and equivalents thereof, but do not exclude other elements or objects. The similar words such as "connect" or "connect to" are not limited to a physical or mechanical connection, but may include an electrical connection, either directly or indirectly. "Upper", "lower", "left", "right", and the like are used merely to indicate a relative positional relationship, and when an absolute position of an object described changes, the relative positional relationship may also change accordingly.

In the field of distributed computing environments, cloud computing is becoming increasingly important as a way to achieve more flexible, scalable, and efficient systems. However, as users of cloud computing services lose direct control over data and applications hosted by cloud providers, trustworthiness of cloud services has become a major problem hindering deployment of cloud applications.

To attract users to use cloud services, cloud/service providers provide trusted services to assure the users that data and applications provided to the services remain secure and protected, and that the services will use the data and applications only as expected by the users.

The trusted services may be developed using a trusted execution environment (TEE), such as Intel SGX, TDX, AMD SEV, ARM TrustZone, and the like. The trusted execution environment is a hardware-based security technology, and a secure computing environment isolated from an external environment is constructed by dividing a secure part and a non-secure part. The secure computing environment can ensure confidentiality and integrity of data and code loaded therein.

When the trusted execution environment technology is implemented, a remote attestation mechanism is provided. A requester initiates a remote attestation request to a trusted application, and the application can obtain a remote attestation report and provide the remote attestation report to the requester. By verifying the remote attestation report, the requester can confirm that the application runs on a trusted hardware platform, and running logic of the application is not tampered with, thereby ensuring data security.

The remote attestation report usually includes an application measurement value. The application measurement value is a hash value calculated based on code and data of the application, and can be used to verify the identity and integrity of the application. During remote attestation, the requester receives the remote attestation report sent by the application, and obtains the application measurement value from the remote attestation report, and then compares the application measurement value with a pre-obtained reference value, where the reference value is synchronized to another trusted application by the application after the application is developed. When remote attestation is performed between a plurality of trusted applications, the following problems occur:

(1) Two-way remote attestation is performed between trusted applications, and it is necessary to obtain a measurement value of another application as a part of the measurement content of the trusted applications, resulting in a circular dependency problem.

Specifically, when an application A is developed, an application measurement value MRE_A of the application A is obtained. When an application B needs to verify the application A, the application measurement value MRE_A of the application A is written into code or configuration information of the application B as a reference value, and an application measurement value MRE_B of the application B is generated by measuring the application B. If the application A also verifies the application B, the application measurement value MRE_B of the application B needs to be written into the code or configuration information of the application A, resulting in a change in the code or configuration information of the application A. This results in a difference between an application measurement value MRE_A' of the application A obtained through calculation at this time and the MRE_A, that is, the application measurement value of the application A changes, and subsequent remote attestation cannot be performed.

(2) Before an application A is upgraded, the application B verifies the application A based on an application measurement value MRE_A of the application A as a reference value. After the application A is upgraded, code or configuration information of the application A changes, resulting in a difference between an application measurement value MRE_A' of the application A and the MRE_A, that is, the application measurement value of the application A also changes, and the application B cannot verify a new reference value of the application A in the subsequent process.

To solve the above problems, the following solutions may be used in the related art:

Solution A: The developer is used as a trusted third party, and the identity of each application is verified based on developer information. Taking an SGX environment as an example, an enclave in each SGX environment includes two identity credentials, namely an application measurement value (MRENCLAVE) and a developer public key measurement value (MRSINGER). After a key of the developer is determined, the same public key is used to sign each enclave, and the enclaves confirm identities of each other through the developer public key measurement value. In this solution, a trusted developer needs to be relied on, and the integrity of code and running logic of other applications is not verified between the applications.

In this case, if the developer key is lost, an attacker can create a malicious application and enter and communicate with the original application through a qualified developer key, and then the data of the user may be obtained by the attacker, and data security of the user cannot be ensured.

Solution B: A plurality of enclaves are used as a group, an application measurement value of code of each application in the group of enclaves is used as a reference value, and an intermediate measurement value is calculated based on the application measurement value of the code of each application in the group of enclaves. When performing remote attestation, the application calculates a final measurement value of another application from the intermediate measurement value through its own tool or logic, thereby implementing remote attestation based on the final measurement value of the other application. This can avoid the circular dependency problem caused by writing the application measurement value into the code or configuration information of the application.

However, because the intermediate measurement value is calculated based on the application measurement value of the code of each application, when an application in the group of enclaves is updated, the code or configuration information of the application changes, the application measurement value of the application, that is, the reference value, also changes, and other applications cannot calculate the final measurement value of the application from the intermediate measurement value, so that remote attestation cannot be performed on the application. Meanwhile, if a new application needs to be added to the group of enclaves, the application cannot obtain the final measurement value of another application from the intermediate measurement value, and the other application cannot obtain the final measurement value of the new application from the intermediate measurement value, so that the new application cannot perform remote attestation with the other application.

In view of this, embodiments of the present disclosure provides a remote attestation method, which uses a trusted storage module to store identity information for remote attestation, to solve the above problems.

The remote attestation method is applied to a first application, and the first application runs in a first trusted execution environment. As shown in FIG. 1, the method includes the following steps.

Step S101: Initiate a remote attestation request to a second application, wherein the second application runs in a second trusted execution environment.

The trusted execution environment (TEE) involved in embodiments of the present specification can provide a secure execution environment for software. The TEE is a trusted execution environment that is a security extension based on a CPU hardware and is completely isolated from the outside. Taking Intel SGX (hereinafter referred to as SGX) technology as an example, a trusted computing node may create an enclave based on the SGX technology as a TEE for the first application and the second application to run. A new processor instruction in the CPU may be used to allocate a partial region EPC (Enclave Page Cache) in the memory to host the enclave. The memory region corresponding to the EPC is encrypted by a memory encryption engine MEE (Memory Encryption Engine) inside the CPU, and content (code and data in the enclave) in the memory region can be decrypted only in a CPU core, and a key for encryption and decryption is generated and stored in the CPU only when the EPC is started. It can be seen that the security boundary of the enclave includes only the enclave and the CPU, and the enclave cannot be accessed by either privileged or unprivileged software. Even an operating system administrator and a VMM (virtual machine monitor; or Hypervisor) cannot affect the code and data in the enclave, so the enclave has extremely high security. On the premise of the security guarantee, the CPU can process plaintext trusted storage module transactions in the enclave, which has extremely high operation efficiency, thereby giving consideration to both data security and computing efficiency.

In the embodiments, the first application runs in the first trusted execution environment, and the second application runs in the second trusted execution environment. The first trusted execution environment and the second trusted execution environment may be deployed on a same trusted computing node, or the first trusted execution environment and the second trusted execution environment may be deployed on different trusted computing nodes, which is not limited in the present specification. The first trusted execution environment and the second trusted execution environment may be a same trusted execution environment, or the first trusted execution environment is different from the second trusted execution environment, which is not limited in this embodiment.

In the embodiments, when the first application wants to perform remote attestation on the second application, the first application may generate a first request value and send the first request value to the second application, to initiate a remote attestation request to the second application. The first request value may be a random number generated by the first application.

Step S103: Obtain a first attestation response returned by the second application.

After receiving the first request value sent by the first application, the second application generates the first attestation response based on the remote attestation request initiated by the first application, and sends the first attestation response to the first application. Then, the first application can obtain the first attestation response returned by the second application. The first attestation response is used to implement remote attestation for the second application. The remote attestation may include remote identity attestation and/or integrity attestation of code and running logic of the application.

Step S105: Obtain a first attestation evidence of the second application from a target trusted storage module, wherein the first attestation evidence is uploaded and stored in the target trusted storage module by the second application.

The first application can obtain the first attestation evidence of the second application from the target trusted storage module. The first attestation evidence is a reference value for performing remote attestation on the second application, and the first attestation evidence is uploaded and stored in the target trusted storage module by the second application in advance. For example, the first attestation evidence of the second application is obtained and uploaded and stored in the target trusted storage module after the second application is developed or updated. In this way, when the first application needs to perform remote attestation on the second application, the latest first attestation evidence can be obtained from the target trusted storage module as the reference value for performing remote attestation on the second application.

Meanwhile, because the first attestation evidence is stored in the target trusted storage module instead of the application, the attestation evidence of the application itself does not change, and subsequent remote attestation for the application is not affected. Meanwhile, when a new application is added or an application is updated, it is only required to obtain the attestation evidence of the new application or the updated new version of the application, and upload and store the attestation evidence in the trusted storage module. When another application needs to initiate a remote attestation request to the new application or the new version of the application, the requesting application can directly obtain the latest attestation evidence from the trusted storage module as the reference value for performing remote attestation, without worrying that the latest attestation evidence is not stored in the code or configuration information of the requesting application.

In some embodiments, the target trusted storage module may be a decentralized trusted storage module unit, a trusted storage module device, or a trusted storage module space, such as a blockchain. The blockchain is a distributed ledger technology that links data together in blocks to form an immutable, transparent, and decentralized database. When trusted applications such as the first application and the second application upload information such as attestation evidence and verification policies to the blockchain, the blockchain can ensure the security of transmission and storage of the information such as the attestation evidence and the verification policies.

Step S107: Perform remote attestation based on the first attestation response and the first attestation evidence, to obtain a first remote attestation result for the second application.

After obtaining the first attestation response returned by the second application and the first attestation evidence that is used as the reference value, the first application can perform remote attestation on the second application based on the first attestation response and the first attestation evidence, to obtain the first remote attestation result for the second application.

In the embodiments, the second application uploads, in advance, the first attestation evidence that is used as the remote attestation reference value of the second application to the target trusted storage module, so that when the first application needs to perform remote attestation on the second application, the first application can directly obtain, from the target trusted storage module, the first attestation evidence that is used as the reference value, and perform remote attestation in combination with the first attestation response that is directly obtained from the second application by initiating the remote attestation request, to obtain the final remote attestation result. In this process, because the first attestation evidence that is used as the reference value is stored in the target trusted storage module instead of the first application, the attestation evidence of the first application itself does not change, and subsequent remote attestation of the first application is not affected, that is, there is no need to worry about the circular dependency problem caused by two-way attestation. Meanwhile, because the first attestation evidence is uploaded and stored in the target trusted storage module, when the second application is a new application or the second application is updated, it is only required to obtain the attestation evidence of the new version of the second application and upload and store the attestation evidence to the target trusted storage module. When the first application initiates the remote attestation request to the second application, the first application obtains, from the target trusted storage module, the first attestation evidence corresponding to the latest version of the second application as the reference value for remote attestation. In this way, remote attestation between applications can be implemented even when a new application is added or an application is updated.

In some embodiments, the remote attestation method described in step S101 to step S107 may be applied to one-way remote attestation of the first application to the second application, or may be applied to two-way remote attestation between the first application and the second application.

In some embodiments, when the remote attestation method described in step S101 to step S107 is applied to two-way remote attestation between the first application and the second application: for remote attestation of the first application to the second application, the remote attestation method described in step S101 to step S107 may be used; and for remote attestation of the second application to the first application, the remote attestation method described in step S101 to step S107 may be used, or another feasible remote attestation method may be used, which is not limited in this embodiment. In some embodiments, the first attestation response comprises a first remote attestation report, and the first remote attestation report may include information such as hardware TCB information, an application measurement value, application custom data, and a hardware signature. Through the first remote attestation report, the first application can confirm that the second application runs on a trusted hardware platform, and running logic of the application is not tampered with, thereby ensuring data security in subsequent communication with the second application. The first remote attestation report is generated based on the remote attestation request initiated by the first application to the second application.

In some embodiments, the first attestation response may also include identity verification information for verifying the identity of the second application, so that the first application can verify the identity of the second application based on the identity verification information, thereby ensuring data security in subsequent communication with the second application. The first attestation response may also include other information for performing remote attestation on the second application to ensure secure communication between the first application and the second application, which is not limited in this embodiment.

In some embodiments, the first attestation evidence comprises reference application measurement value information of the second application, and the reference application measurement value information is generated and uploaded to the target trusted storage module based on creation or updating of the second application in the second trusted execution environment.

In the embodiments, when the second application is developed in the second trusted execution environment, a hash value is calculated based on code and data of the second application to obtain an application measurement value of the second application, and the application measurement value is uploaded to the target trusted storage module for storage as a reference value for a further application to perform remote verification on the second application, that is, the reference application measurement value information.

Alternatively, when the second application is updated in the second trusted execution environment, the hash value is recalculated based on code and data of the new version of the second application to obtain a new application measurement value of the new version of the second application, and the new application measurement value is uploaded to the target trusted storage module to replace an old application measurement value of the second application that is stored in the target trusted storage module. Alternatively, the new application measurement value and application version information of the second application are also stored in the target trusted storage module, and a further application obtains, from the target trusted storage module based on a current version of the second application (for example, version information of the second application may be stored in a remote attestation report) when performing a remote request on the second application, an application measurement value corresponding to the version as the reference application measurement value information, to implement remote attestation for the second application. This is not limited in this embodiment.

In the embodiments, because the application measurement value of the second application is stored in the target trusted storage module instead of in the code or configuration information of the application, the application measurement value of each application used as the reference value does not change. Meanwhile, when the second application is a new application or a new version of an updated application, it is only required to obtain the new application measurement value of the new second application or the new version of the second application, and upload and store the new application measurement value in the target trusted storage module. When a further application such as the first application needs to initiate a remote attestation request to the new second application or the new version of the second application, the requesting application can directly obtain the latest application measurement value of the first application from the target trusted storage module as the reference application measurement value information for performing remote attestation, without worrying that the latest attestation evidence is not stored in the code or configuration information of the requesting application.

Figure 2:
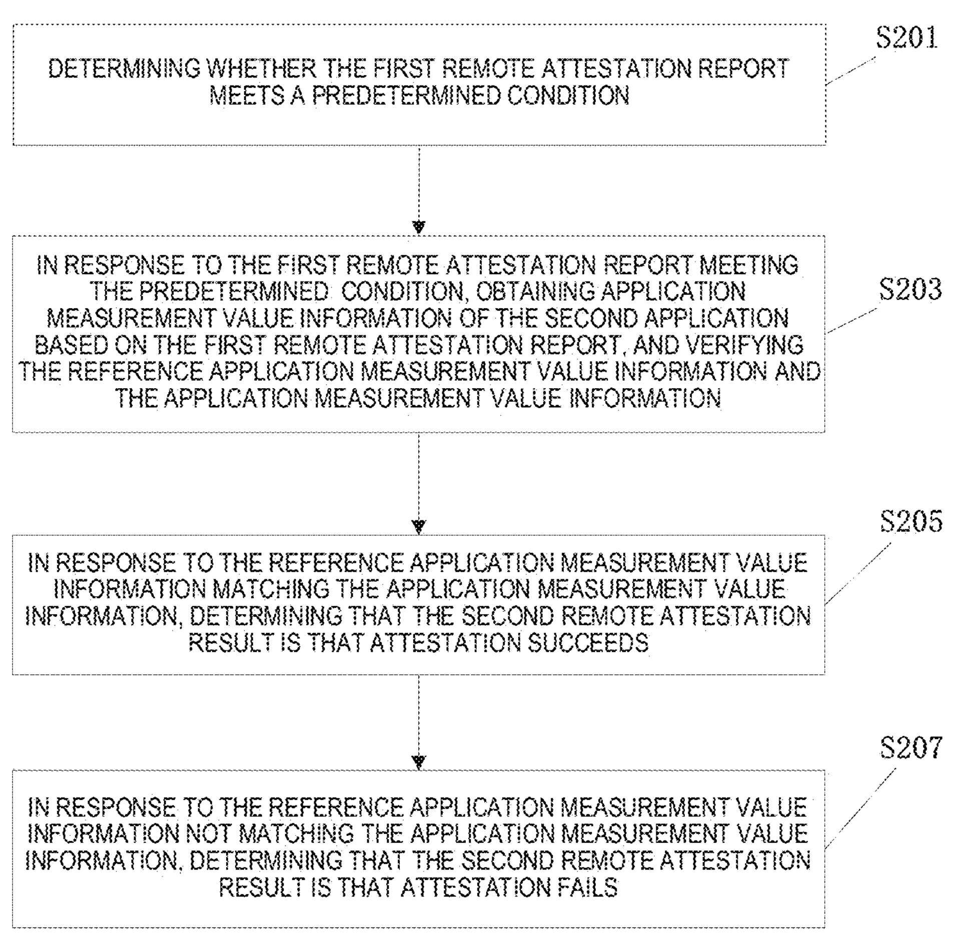
FIG. 2 is a schematic flowchart of an exemplary method according to an embodiment of the present disclosure.

In some embodiments, when the first attestation evidence comprises the reference application measurement value information of the second application, as shown in FIG. 2, performing the remote attestation based on the first attestation response and the first attestation evidence, to obtain the first remote attestation result for the second application in step S107 comprises:

step S201: determining whether the first remote attestation report meets a predetermined condition.

In the embodiments, the first remote attestation report includes a hardware signature. After the first remote attestation report is obtained, the hardware signature in the first remote attestation report may be obtained, and the hardware signature in the first remote attestation report is verified to determine whether the first remote attestation report is a remote attestation report that meets the predetermined condition, thereby determining whether the first remote attestation report is a remote attestation report generated by a trusted application running in a trusted execution environment.

The hardware signature may be verified by calling a smart contract, or may be verified in another feasible manner, to determine whether the first remote attestation report meets the predetermined condition. This is not limited in this embodiment.

step S203: in response to the first remote attestation report meeting the predetermined condition, obtaining application measurement value information of the second application based on the first remote attestation report, and verifying the reference application measurement value information and the application measurement value information.

step S205: in response to the reference application measurement value information matching the application measurement value information, determining that the first remote attestation result is that attestation succeeds.

step S207: in response to the reference application measurement value information not matching the application measurement value information, determining that the first remote attestation result is that attestation fails.

In the embodiments, when the first attestation evidence is the reference application measurement value information of the second application, the first remote attestation report is parsed to obtain the application measurement value information of the second application from the first remote attestation report, and verification is performed based on the reference application measurement value information obtained from the target trusted storage module and the application measurement value information sent by the second application. When the reference application measurement value information matches the application measurement value information, it may be determined that the first remote attestation result of the first application to the second application is that attestation succeeds; and when the reference application measurement value information does not match the application measurement value information, it may be determined that the first remote attestation result of the first application to the second application is that attestation fails.

In some embodiments, before performing the remote attestation based on the first attestation response and the first attestation evidence in step S107, the method further comprises:

step S301: obtaining additional information in the first attestation response.

step S303: obtaining first information based on the first remote attestation report, and determining an association relationship between the first remote attestation report and the second application based on the additional information and the first information.

The additional information may include information such as a request value of the first application, a public key of the second application, or a random number generated by the second application. This is not limited in this embodiment.

Meanwhile, the first remote attestation report also stores the information such as the request value of the first application, the public key of the second application, or the random number generated by the second application, that is, the first information. In the embodiments, it is determined, based on the additional information and the first information obtained from the first remote attestation report, whether the first remote attestation report is from the second application. When the additional information is consistent with the first information, it indicates that the first remote attestation report is from the second application, and no replay attack occurs. When the additional information is inconsistent with the first information, it indicates that the first remote attestation report is not from the second application, and a replay attack occurs. Therefore, anti-replay attack can be implemented through the additional information.

In some embodiments, the method further comprises: obtaining a first verification policy of the first application from the target trusted storage module, wherein the first verification policy is uploaded and stored in the target trusted storage module by the first application, and the first verification policy is used for remote attestation of the first application for a further application, and the further application comprises the second application.

Performing the remote attestation based on the first attestation response and the first attestation evidence in step S107 comprises: verifying the first attestation response and the first attestation evidence based on the first verification policy.

When the first application is created or updated in the first trusted execution environment, the first application may upload and store the first verification policy in the target trusted storage module. When the first application needs to perform remote attestation on another application including the second application, the first application obtains its first verification policy from the target trusted storage module, to verify the other application including the second application based on the first verification policy.

The first verification policy is a policy used by the first application to perform remote attestation on another application including the second application, and includes information such as verification content and verification logic. The first verification policy may be set based on a use requirement. For example, the first verification policy includes: the second application being a trusted application, and a remote attestation type of the second application being SGX DCAP, and an application measurement value needing to be verified during verification.

When the first application performs remote attestation on the second application, the first application may first determine whether the remote attestation type of the second application is SGX DCAP, and then match the reference application measurement value information and the application measurement value information of the second application by using the first verification policy, to obtain the first remote attestation result.

In the embodiments, when a verification policy of the first application for another application changes, or a new application is added and the first application needs to verify the new application, a verification policy for the new application needs to be added to the first verification policy. Because the first verification policy of the first application is stored in the target trusted storage module, the first verification policy can be directly modified and then uploaded and stored in the target trusted storage module. In this way, when the first application needs to perform remote attestation on an application for which the verification policy changes or the new application in the subsequent process, the modified first verification policy can be directly obtained from the target trusted storage module, thereby solving the verification problem of the updated application or the new application.

In some embodiments, the method further comprises: setting an attestation service in a smart contract of the target trusted storage module; and verifying the first attestation response and the first attestation evidence based on the first verification policy in step S107 comprises: verifying the first attestation response and the first attestation evidence based on the first verification policy by the smart contract.

In the embodiments, after implementing the TEE and the remote attestation mechanism, a hardware vendor provides a basic library and interface related to verification of the remote attestation report, and a developer, a cloud service provider, or the like can provide an easy-to-use attestation service based on the basic interface, and deploy the attestation service as a smart contract in the trusted storage module. The attestation service can verify the remote attestation report based on the configured verification policy, and return a detailed remote attestation result.

That is, in the embodiments, the attestation service for implementing remote attestation can be deployed in the target trusted storage module as a smart contract. When the first application needs to perform remote attestation on the second application, the attestation service can be called in the target trusted storage module to match the reference application measurement value information and the application measurement value information based on the first verification policy, to obtain the first remote attestation result.

In some embodiments, the first application may also obtain the attestation service and the first verification policy from the target trusted storage module, and call the attestation service locally at the first application to match the reference application measurement value information and the application measurement value information based on the first verification policy, to obtain the first remote attestation result. This is not limited in this embodiment.

In some embodiments, the first attestation evidence comprises at least one of the following:

application identification information (ID) of the second application, which is used to uniquely identify the second application.

application version information (version) of the second application, which is used to mark a current version of the second application.

at least one remote attestation type of the second application. The second application may run in different trusted execution environments, for example, may run in trusted execution environments such as Intel SGX, TDX, AMD SEV, and ARM TrustZone. For the second application in different trusted execution environments, different remote attestation methods are used. Therefore, different remote attestation types are set to distinguish remote attestation of the second application running in different environments.

at least one piece of application measurement value information of the second application, wherein the application measurement value information is associated with the remote attestation type. Because the second application may run in different trusted execution environments, the code and data of the second application in different trusted execution environments may be different to some extent, and therefore corresponding application measurement value information is also different. In addition, because both are related to the trusted execution environment in which the second application runs, and the application measurement value information is related to the remote attestation method, the remote attestation type is associated with the application measurement value information. For example, the remote attestation type and the application measurement value information are in a one-to-one correspondence.

In some embodiments, the first attestation evidence is uploaded and stored in the target trusted storage module when the second application is created or updated. That is, the application identification information, the application version information, the at least one remote attestation type, and the at least one piece of application measurement value information of the second application are uploaded and stored in the target trusted storage module when the second application is created or updated.

In some embodiments, when the second application is created or updated, the second application also obtains its own developer measurement value, and uploads and stores the developer measurement value in the target trusted storage module, so that the developer measurement value can be used when needed.

In some embodiments, when the second application is created or updated, the second application also obtains its own second verification policy and stores the second verification policy in the target trusted storage module, so that when the second application needs to perform remote attestation on a further application including the first application, the second application can obtain the second verification policy from the target trusted storage module, and then call the attestation service deployed in the target trusted storage module to perform remote attestation on the further application including the first application based on the second verification policy.

Taking two-way remote attestation between the first application and the second application as an example, when the first application is developed completely or updated in the first trusted execution environment, the first application needs to upload and store a second attestation evidence in the target trusted storage module. The second attestation evidence comprises at least one of the following:

application identification information of the first application, wherein the application identification information (ID) is used to uniquely identify the first application.

application version information (version) of the first application, which is used to mark a current version of the first application.

at least one remote attestation type of the first application. The first application may run in different trusted execution environments, for example, may run in trusted execution environments such as Intel SGX, TDX, AMD SEV, and ARM TrustZone. For the first application in different trusted execution environments, different remote attestation methods are used. Therefore, different remote attestation types are set to distinguish remote attestation of the first application running in different environments.

at least one piece of application measurement value information of the first application, wherein the application measurement value information is associated with the remote attestation type. Because the first application may run in different trusted execution environments, the code and data of the first application in different trusted execution environments may be different to some extent, and therefore corresponding application measurement value information is also different. In addition, because both are related to the trusted execution environment in which the first application runs, and the application measurement value information is related to the remote attestation method, the remote attestation type is associated with the application measurement value information. For example, the remote attestation type and the application measurement value information are in a one-to-one correspondence.

For the two-way remote attestation between the first application and the second application, in response to the first remote attestation result being that attestation succeeds, the method further comprises:

step S401: generating a second attestation response and sending the second attestation response to the second application.

After the remote attestation of the first application for the second application succeeds, the first application generates the second attestation response and sends the second attestation response to the second application. After the second application receives the second attestation response, step S403 is performed.

step S403: causing the second application to perform step S4031 to step S4033:

step S4031: obtaining the second attestation evidence of the first application from the target trusted storage module, wherein the second attestation evidence is uploaded and stored in the target trusted storage module by the first application.

The second application may obtain the second attestation evidence of the first application from the target trusted storage module. The second attestation evidence is a reference value for performing remote attestation on the first application, and the second attestation evidence is uploaded and stored in the target trusted storage module by the first application in advance. For example, the second attestation evidence of the first application is obtained and uploaded and stored in the target trusted storage module after the first application is developed or updated. In this way, when the second application needs to perform remote attestation on the first application, the latest second attestation evidence can be obtained from the target trusted storage module as the reference value for performing remote attestation on the first application.

Meanwhile, because the second attestation evidence is stored in the target trusted storage module instead of the application, the attestation evidence of the application itself does not change, and subsequent remote attestation of the application is not affected. Meanwhile, when a new application is added or an application is updated, it is only required to obtain the attestation evidence of the new application or the updated new version of the application, and upload and store the attestation evidence in the trusted storage module. When another application needs to initiate a remote attestation request to the new application or the new version of the application, the requesting application can directly obtain the latest attestation evidence from the trusted storage module as the reference value for performing remote attestation, without worrying that the latest attestation evidence is not stored in the code or configuration information of the requesting application.

step S4033: performing remote attestation based on the second attestation response and the second attestation evidence, to obtain a second remote attestation result for the first application.

After obtaining the second attestation response returned by the first application and the second attestation evidence that is used as the reference value, the second application can perform remote attestation on the first application based on the second attestation response and the second attestation evidence, to obtain the second remote attestation result for the first application.

In the embodiments, the first application uploads, in advance, the second attestation evidence that is used as the remote attestation reference value of the first application to the target trusted storage module, so that when the second application needs to perform remote attestation on the first application, the second application can directly obtain, from the target trusted storage module, the second attestation evidence that is used as the reference value, and perform remote attestation in combination with the second attestation response that is directly obtained from the first application, to obtain the final remote attestation result. In this process, because the second attestation evidence that is used as the reference value is stored in the target trusted storage module instead of the second application, the attestation evidence of the second application itself does not change, and subsequent remote attestation of the second application is not affected, that is, there is no need to worry about the circular dependency problem caused by two-way attestation. Meanwhile, because the second attestation evidence is uploaded and stored in the target trusted storage module, when the first application is a new application or the first application is updated, it is only required to obtain the attestation evidence of the new version of the first application and upload and store the attestation evidence to the target trusted storage module. When the second application performs remote attestation on the first application, the second application obtains, from the target trusted storage module, the second attestation evidence corresponding to the latest version of the first application as the reference value for remote attestation. In this way, remote attestation between applications can be implemented even when a new application is added or an application is updated.

In some embodiments, the second attestation response comprises a second remote attestation report, and the second remote attestation report may include information such as hardware TCB information, an application measurement value, application custom data, and a hardware signature. Through the second remote attestation report, the second application can confirm that the first application runs on a trusted hardware platform, and running logic of the application is not tampered with, thereby ensuring data security in subsequent communication with the first application.

In some embodiments, the second attestation response may also include identity verification information for verifying the identity of the first application, so that the first application can verify the identity of the first application based on the identity verification information, thereby ensuring data security in subsequent communication with the first application. The second attestation response may also include other information for performing remote attestation on the first application to ensure secure communication between the second application and the first application, which is not limited in this embodiment.

In some embodiments, the second attestation evidence comprises reference application measurement value information of the first application, and the reference application measurement value information is generated and uploaded to the target trusted storage module based on creation or updating of the first application in the first trusted execution environment.

In some embodiments, when the second attestation evidence comprises the reference application measurement value information of the first application, performing the remote attestation based on the second attestation response and the second attestation evidence, to obtain the second remote attestation result for the first application comprises:

step S501: determining whether the second remote attestation report meets a predetermined condition.

In the embodiments, the second remote attestation report also includes a hardware signature. After the second remote attestation report is obtained, the hardware signature in the second remote attestation report may be obtained, and the hardware signature in the second remote attestation report is verified to determine whether the second remote attestation report is a remote attestation report that meets the predetermined condition, thereby determining whether the second remote attestation report is a remote attestation report generated by a trusted application running in a trusted execution environment.

The hardware signature may be verified by calling a smart contract, or may be verified in another feasible manner, to determine whether the second remote attestation report meets the predetermined condition. This is not limited in this embodiment.

step S503: in response to the second remote attestation report meeting the predetermined condition, obtaining application measurement value information of the first application based on the second remote attestation report, and verifying the reference application measurement value information and the application measurement value information.

step S505: in response to the reference application measurement value information matching the application measurement value information, determining that the second remote attestation result is that attestation succeeds.

step S507: in response to the reference application measurement value information not matching the application measurement value information, determining that the second remote attestation result is that attestation fails.

In the embodiments, when the second attestation evidence is the reference application measurement value information of the first application, the second remote attestation report is parsed to obtain the application measurement value information of the first application from the second remote attestation report, and verification is performed based on the reference application measurement value information obtained from the target trusted storage module and the application measurement value information sent by the first application. When the reference application measurement value information matches the application measurement value information, it may be determined that the second remote attestation result of the second application to the first application is that attestation succeeds; and when the reference application measurement value information does not match the application measurement value information, it may be determined that the second remote attestation result of the second application to the first application is that attestation fails.

In some embodiments, before performing the remote attestation based on the second attestation response and the second attestation evidence in step S107, the method further comprises:

step S601: obtaining additional information in the second attestation response.

step S603: obtaining second information based on the second remote attestation report, and determining an association relationship between the second remote attestation report and the first application based on the additional information and the second information.

The additional information may include information such as a public key of the first application or a random number generated by the first application. This is not limited in this embodiment.

Meanwhile, the second remote attestation report also stores the information such as the public key of the first application or the random number generated by the first application, that is, the second information. In this embodiment, it is determined, based on the additional information and the second information obtained from the second remote attestation report, whether the second remote attestation report is from the first application. When the additional information is consistent with the second information, it indicates that the second remote attestation report is from the first application, and no replay attack occurs. When the additional information is inconsistent with the second information, it indicates that the second remote attestation report is not from the first application, and a replay attack occurs. Therefore, anti-replay attack can be implemented through the additional information.

In some embodiments, the method further comprises: obtaining a second verification policy of the second application from a target trusted storage module, wherein the second verification policy is uploaded and stored in the target trusted storage module by the second application, and the second verification policy is used for remote attestation of the second application for a further application, and the further application comprises the first application.

Performing the remote attestation based on the second attestation response and the second attestation evidence comprises: verifying the second attestation response and the second attestation evidence based on the second verification policy.

When the second application is created or updated in the second trusted execution environment, the second application may upload and store the second verification policy in the target trusted storage module. When the second application needs to perform remote attestation on a further application including the first application, the second application obtains the second verification policy from the target trusted storage module, to verify the further application including the first application based on the second verification policy.

The second verification policy is a policy used by the second application to perform remote attestation on the further application including the first application, and includes information such as verification content and verification logic.

In some embodiments, the method further comprises: setting an attestation service in a smart contract of the target trusted storage module; and verifying the second attestation response and the second attestation evidence comprises: verifying the second attestation response and the second attestation evidence based on the second verification policy by the smart contract.

That is, in the embodiments, the attestation service for implementing remote attestation can be deployed in the target trusted storage module as a smart contract. When the second application needs to perform remote attestation on the first application, the attestation service can be called in the target trusted storage module to match the reference application measurement value information and the application measurement value information based on the second verification policy, to obtain the second remote attestation result.

In some embodiments, the second application may also obtain the attestation service and the second verification policy from the target trusted storage module, and call the attestation service locally at the second application to match the reference application measurement value information and the application measurement value information based on the second verification policy, to obtain the second remote attestation result. This is not limited in this embodiment.

In some embodiments, when the second remote attestation result is that attestation succeeds, the method further comprises:

step S701: obtaining a public key of the second application, generating a first session key based on a private key of the first application and the public key of the second application, and communicating with the second application based on the first session key; and step S703: causing the second application to obtain a public key of the first application, generate a second session key based on a private key of the second application and the public key of the first application, and communicate with the first application based on the second session key, wherein the first session key is the same as the second session key.

In the embodiments, when the second application generates the first remote attestation report, a pair of keys is also generated, and the public key in the pair of keys is sent to the first application together with the first remote attestation report. Correspondingly, when the first application generates the second remote attestation report, a pair of keys is also generated, and the public key in the pair of keys is sent to the second application together with the second remote attestation report.

When the two-way remote attestation between the first application and the second application both succeeds, the first application and the second application both calculate a session key based on its private key and the public key of the other party, and the session keys calculated by the two applications are the same. In this way, the first application and the second application can encrypt and protect interaction data between the two applications based on the session key.

In some embodiments, the method further comprises: in response to the first application and/or the second application being an open-source application, uploading and storing application code of the first application and/or the second application to a public address.

In the embodiments, when the first application and/or the second application is an open-source application, after the first application and/or the second application is developed or updated, the application code of the first application and/or the second application is uploaded to the public address in the form of source code or an image, so that a user or another developer can review the code and reproduce the measurement value.

The public address may be the target trusted storage module, or may be another platform. This is not limited in this embodiment.

In the embodiments, the information such as the application measurement value and the verification policy are uploaded to the trusted storage module, and the trusted storage module is used to store the trusted application information and the verification policy. In this way, the application is prevented from directly using the application measurement value to be verified as a part of its own code, and the circular dependency problem in two-way remote attestation between trusted applications is solved, so that verification between a plurality of trusted applications can be implemented. When the application is iterated, the latest application information or verification policy can be uploaded to the trusted storage module. During remote attestation, the latest application information is obtained as the verification reference value, and verification is performed based on the latest policy, so that the verification problem during application updating is solved.

Figure 3:
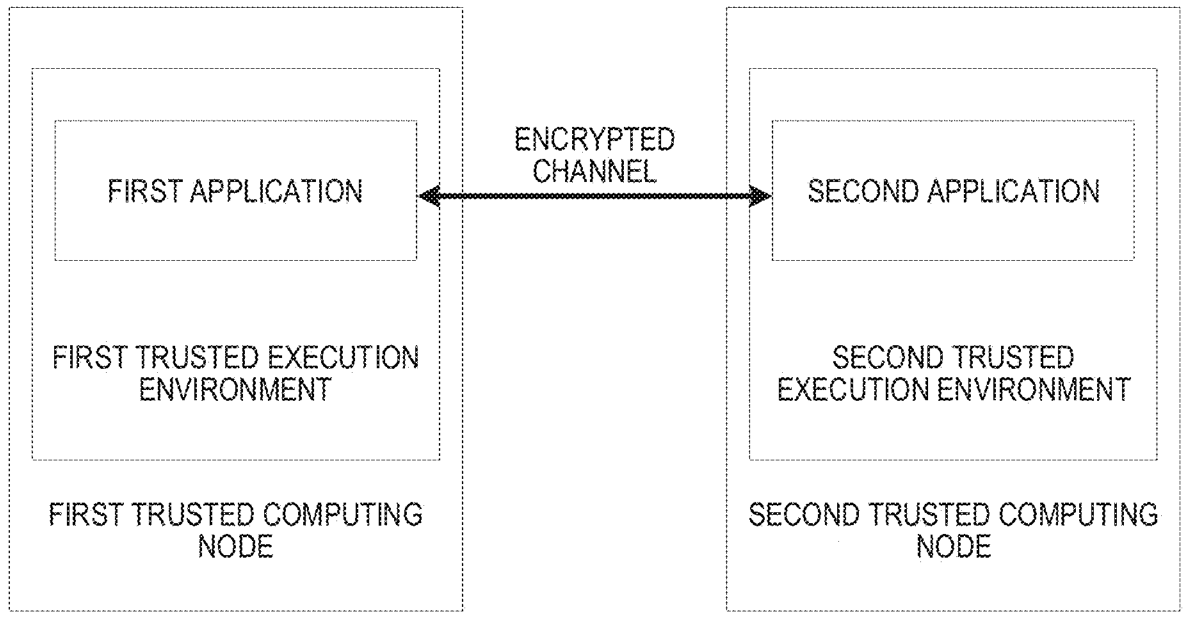
FIG. 3 is a schematic diagram of an exemplary network architecture according to an embodiment of the present disclosure.

FIG. 3 shows a schematic diagram of an exemplary network architecture according to an embodiment of the present disclosure.

As shown in FIG. 3, the network architecture includes a first trusted computing node and a second trusted computing node, where the first trusted computing node may be the second trusted computing node, or the first trusted computing node is different from the second trusted computing node.

A first trusted execution environment is deployed in the first trusted computing node, and a first application runs in the first trusted execution environment; a second trusted execution environment is deployed in the second trusted computing node, and a second application runs in the second trusted execution environment. Both the first trusted execution environment and the second trusted execution environment include an interface program for a caller to communicate and a trusted computing program that actually executes the computing process.

The first application and the second application can communicate with the interface program through a network connection. For example, when the first trusted computing node is different from the second trusted computing node, the first application and the second application establish an encrypted channel with the interface program, to implement encrypted communication between the first application and the second application. When the first trusted computing node and the second trusted computing node are the same hardware node, it may be considered that both the first trusted execution environment and the second trusted execution environment are deployed in the first trusted computing node, that is, the trusted application and the interface program run on the same hardware node, so that the trusted application can directly locally call the interface program without the need to establish a network connection. Certainly, the communication can also be performed through the network connection. In addition, it should be noted that when the first trusted computing node and the second trusted computing node are the same hardware node, the second trusted execution environment and the first trusted execution environment may be the same trusted execution environment, or the second trusted execution environment is different from the first trusted execution environment. This is not limited in the present specification.

The first trusted computing node and the second trusted computing node involved in the embodiments of the present specification may be any hardware/virtual device that can run a computer program to implement any logical function.

The trusted execution environment (TEE) involved in the embodiments of the present specification may provide a secure execution environment for the software. The TEE is a trusted execution environment that is a secure extension based on a CPU hardware and is completely isolated from the outside.

The first application and the second application involved in the embodiments of the present specification are trusted applications, and the trusted applications refer to applications running in the TEE and implemented using the verifiable computing technology.

The technical solution of the present application is further described below by using a remote attestation method between the first application and the second application as an example.

First, after implementing the TEE and the remote attestation mechanism, a hardware vendor provides basic libraries and interfaces related to verification of the remote attestation report, and a developer, a cloud service provider, or the like can provide an easy-to-use attestation service based on the basic interfaces, and deploy the attestation service as a smart contract in the target trusted storage module.

After the development is completed, the first application and the second application upload their own application information and verification policy to the target trusted storage module. The application information of the first application includes application identification information, application version information, a remote attestation type, application measurement value information, and the like of the first application. The application information of the second application includes application identification information, application version information, a remote attestation type, application measurement value information, and the like of the second application.

The first application uploads and stores its application information in the target trusted storage module as the second attestation evidence, that is, a reference value used by another application to perform remote attestation on the first application. The second application uploads and stores its application information in the target trusted storage module as the first attestation evidence, that is, a reference value used by another application to perform remote attestation on the second application.

Meanwhile, the first application also uploads and stores its second verification information in the target trusted storage module. The second verification policy is a policy used by the second application to perform remote attestation on the first application, and includes information such as verification content and verification logic. The second application uploads and stores its first verification information in the target trusted storage module. The first verification policy is a policy used by the first application to perform remote attestation on the second application, and includes information such as verification content and verification logic.

When the first application and/or the second application is an open-source application, the application code of the first application and/or the second application is also uploaded to a public address in the form of source code or an image, so that a user or another developer can review the code and reproduce the measurement value.

When the first application wants to perform remote attestation on the second application, the first application may generate a first request value and send the first request value to the second application, to initiate a remote attestation request to the second application. The first request value may be a random number generated by the first application.

After receiving the first request value sent by the first application, the second application generates a first remote attestation report, a key pair, and additional information based on the remote attestation request initiated by the first application, and returns the first remote attestation report, the public key in the key pair, and the additional information to the first application as a first attestation response. The first application obtains, from the target trusted storage module, the application information uploaded by the second application, that is, the first attestation evidence. In addition, the first application also obtains the first verification policy of the first application from the target trusted storage module.

Then, the first application uses the first verification policy, the application information of the second application, the first remote attestation report, and the additional information as inputs, calls the smart contract on the target trusted storage module, and performs verification by using the attestation service, to return an attestation result.

In this process, based on information such as verification content and verification logic in the first verification policy, the first application first verifies whether the first remote attestation report is an attestation report that meets a predetermined condition, to determine whether the first remote attestation report is a remote attestation report generated by a trusted application running in a trusted execution environment. After it is proved that the report meets the predetermined condition, the first application parses the first remote attestation report to obtain application measurement value information in the first remote attestation, verifies whether the application measurement value information matches the reference application measurement value information in the first attestation evidence, verifies whether the first information obtained from the first remote attestation report is consistent with the additional information, and returns the first remote attestation result to the first application.

When the first remote attestation result is that verification succeeds, the first application also generates a key pair, a second remote attestation report, and additional information as a second attestation response, and sends the second attestation response to the second application.

The second application performs remote attestation on the first application in the same manner, including: the second application obtaining, from the target trusted storage module, the application information uploaded by the first application, that is, the second attestation evidence. Meanwhile, the second application also obtains the second verification policy of the second application from the target trusted storage module. Then, the second application uses the second verification policy, the application information of the first application, the second remote attestation report, and the additional information as inputs, calls the smart contract on the target trusted storage module, and performs verification by using the attestation service, to return the second remote attestation result.

If the second remote attestation result is also that verification succeeds, the two-way remote attestation between the first application and the second application succeeds. The first application and the second application both calculate a session key based on its private key and the public key of the other party, and the session keys calculated by the two applications are the same. In this way, the first application and the second application can encrypt and protect interaction data between the two applications based on the session key.

When the application is updated, taking the update of the second application as an example: the second application uploading and storing new application measurement value information obtained after the update in the target trusted storage module. When the first application performs remote attestation on the second application, the latest application measurement value information of the second application is obtained from the target trusted storage module as the reference value, and then compared with the application measurement value information in the remote attestation report obtained from the second application, to implement the remote attestation of the first application for the second application.

When a new trusted application is added, taking an added third application as an example: after the third application is developed, the third application immediately uploads and stores its own application measurement value information in the target trusted storage module. When the first application needs to perform remote attestation on the third application or needs to update a verification manner for the application, a developer may update the first verification policy of the first application, add a verification policy for the third application to the first verification policy, and upload the new first verification policy to the target trusted storage module. When the first application performs remote attestation on the third application, the first application can obtain the latest first verification policy and the application measurement value information of the third application from the target trusted storage module, to verify the remote attestation report obtained from the third application, thereby obtaining a remote attestation result of the first application for the third application.

It may be understood that before the technical solution of each embodiment of the present disclosure is used, the user is informed of the type, the use scope, the use scenario, and the like of the personal information involved in an appropriate manner, and the user's authorization is obtained.

For example, when receiving an active request from the user, the user is sent prompt information to explicitly prompt the user that the operation requested to be performed will need to obtain and use the user's personal information. Therefore, the user can independently choose, based on the prompt information, whether to provide the personal information to software or hardware such as the electronic device, the application, the server, or the storage medium that performs the operation of the technical solution of the present disclosure.

As an optional but non-limiting implementation, the manner of sending prompt information to the user in response to receiving the active request from the user may be, for example, in a pop-up window, and the prompt information may be presented in the pop-up window in a text manner. In addition, the pop-up window may also carry a selection control for the user to select "agree" or "disagree" to provide personal information to the electronic device.

It may be understood that the above notification and user authorization obtaining process is merely illustrative and does not limit the implementation of the present disclosure. Other manners that meet the relevant laws and regulations may also be applied to the implementation of the present disclosure.

It should be noted that the method in this embodiment of the present disclosure may be performed by a single device, for example, a computer or a server. The method in this embodiment may also be applied to a distributed scenario, and is completed by a plurality of devices cooperating with each other. In this distributed scenario, one of the plurality of devices may only perform one or more steps of the method in this embodiment of the present disclosure, and the plurality of devices will interact with each other to complete the method.

It should be noted that some embodiments of the present disclosure are described above. Other embodiments are within the scope of the appended claims. In some cases, the actions or steps recited in the claims may be performed in a different order than in the embodiments described above and still achieve the desired results. In addition, the processes depicted in the accompanying drawings do not necessarily require the specific order or sequential order shown to achieve the desired results. In some implementations, multitasking and parallel processing may also be possible or may be advantageous.

Based on the same inventive concept, corresponding to the method in any of the above embodiments, the present disclosure further provides a remote attestation apparatus. The remote attestation apparatus includes a first application, and the first application runs in a first trusted execution environment.

Figures 4, 5:
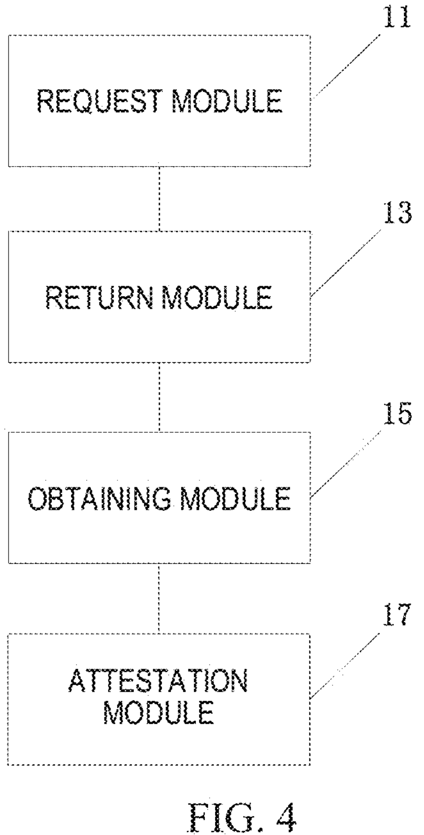
FIG. 4 is a schematic diagram of an exemplary apparatus according to an embodiment of the present disclosure.
FIG. 5 is a schematic diagram of a hardware structure of an exemplary computer device according to an embodiment of the present disclosure.

Referring to FIG. 4, the apparatus includes:

a request module 11, configured to: initiate a remote attestation request to a second application, wherein the second application runs in a second trusted execution environment;

a return module 13, configured to: obtain a first attestation response returned by the second application;

an obtaining module 15, configured to: obtain a first attestation evidence of the second application from a target trusted storage module, wherein the first attestation evidence is uploaded and stored in the target trusted storage module by the second application; and an attestation module 17, configured to: perform remote attestation based on the first attestation response and the first attestation evidence, to obtain a first remote attestation result for the second application.

In some embodiments, the first attestation response comprises a first remote attestation report, and the first remote attestation report is generated based on the remote attestation request.

In some embodiments, the first attestation evidence comprises reference application measurement value information of the second application, and the reference application measurement value information is generated and uploaded to the target trusted storage module based on creation or updating of the second application in the second trusted execution environment.

In some embodiments, the attestation module 17 is further configured to:

determine whether the first remote attestation report meets a predetermined condition;

in response to the first remote attestation report meeting the predetermined condition, obtain application measurement value information of the second application based on the first remote attestation report, and verify the reference application measurement value information and the application measurement value information;

in response to the reference application measurement value information matching the application measurement value information, determine that the first remote attestation result is that attestation succeeds; and in response to the reference application measurement value information not matching the application measurement value information, determine that the first remote attestation result is that attestation fails.

In some embodiments, before performing the remote attestation based on the first attestation response and the first attestation evidence, the apparatus is further configured to: obtain additional information in the first attestation response; and obtain first information based on the first remote attestation report, and determine an association relationship between the first remote attestation report and the second application based on the additional information and the first information.

In some embodiments, the apparatus is further configured to: obtain a first verification policy of the first application from a target trusted storage module; wherein the first verification policy is uploaded and stored in the target trusted storage module by the first application, and the first verification policy is configured for remote attestation of the first application to a further application, and the further application comprises the second application; and the attestation module 17 is further configured to: verify the first attestation response and the first attestation evidence based on the first verification policy.

In some embodiments, the apparatus is further configured to: set a attestation service in a smart contract of the target trusted storage module; and the attestation module 17 is further configured to: verify the first attestation response and the first attestation evidence based on the first verification policy by the smart contract.

In some embodiments, the first attestation evidence comprises at least one of the following:

application identification information of the second application;

application version information of the second application;

at least one remote attestation type of the second application; or at least one piece of application measurement value information of the second application, wherein the application measurement value information is associated with the remote attestation type.

In some embodiments, in response to the first remote attestation result being that attestation succeeds, the apparatus is further configured to:

generate a second attestation response and send the second attestation response to the second application, to cause the second application to perform the following steps:

obtain second attestation evidence of the first application from a target trusted storage module, wherein the second attestation evidence is uploaded and stored in the target trusted storage module by the first application; and perform remote attestation based on the second attestation response and the second attestation evidence, to obtain a second remote attestation result for the first application.

In some embodiments, in response to the second remote attestation result being that attestation succeeds, the apparatus is further configured to:

obtain a public key of the second application, generate a first session key based on a private key of the first application and the public key of the second application, and communicate with the second application based on the first session key; and cause the second application to obtain a public key of the first application, generate a second session key based on a private key of the second application and the public key of the first application, and communicate with the first application based on the second session key;

wherein the first session key is the same as the second session key.

In some embodiments, the apparatus is further configured to:

in response to the first application and/or the second application being an open-source application, upload and store application code of the first application and/or the second application to a public address.

For case of description, the above apparatus is described above as various modules divided according to functions. Certainly, during implementation of the present disclosure, the functions of the modules can be implemented in a same or a plurality of software and/or hardware.

The apparatus in the above embodiment is configured to implement the corresponding remote attestation method in any one of the foregoing embodiments, and has beneficial effects of the corresponding method embodiment. Details are not described herein again.

Based on the same inventive concept, corresponding to the method in any of the above embodiments, the present disclosure further provides an electronic device, including a memory, a processor, and a computer program stored in the memory and executable on the processor, where the processor implements the remote attestation method according to any one of the above embodiments when executing the program.

FIG. 5 shows a schematic diagram of a more specific hardware structure of an electronic device according to this embodiment. The device may include a processor 1010, a memory 1020, an input/output interface 1030, a communication interface 1040, and a bus 1050. The processor 1010, the memory 1020, the input/output interface 1030, and the communication interface 1040 implement communication connection with each other inside the device through the bus 1050.

The processor 1010 may be implemented by a general-purpose CPU (Central Processing Unit), a microprocessor, an ASIC (Application Specific Integrated Circuit), or one or more integrated circuits, and is configured to execute a related program, to implement the technical solution provided in the embodiments of the present specification.

The memory 1020 may be implemented in the form of a ROM (Read Only Memory), a RAM (Random Access Memory), a static storage device, a dynamic storage device, or the like. The memory 1020 may store an operating system and other application programs, and when the technical solution provided in the embodiments of the present specification is implemented by software or firmware, the related program code is stored in the memory 1020 and called and executed by the processor 1010.

The input/output interface 1030 is configured to connect to an input/output module, to implement information input and output. The input/output module may be configured in the device as a component (not shown in the figure), or may be externally connected to the device to provide a corresponding function. The input device may include a keyboard, a mouse, a touchscreen, a microphone, various sensors, and the like, and the output device may include a display, a speaker, a vibrator, an indicator light, and the like.

The communication interface 1040 is configured to connect to a communication module (not shown in the figure), to implement communication and interaction between this device and another device. The communication module may implement communication in a wired manner (for example, a USB cable or a network cable) or in a wireless manner (for example, a mobile network, WIFI, or Bluetooth).

The bus 1050 includes a path for transmitting information between components (for example, the processor 1010, the memory 1020, the input/output interface 1030, and the communication interface 1040) of the device.

It should be noted that although the above device shows only the processor 1010, the memory 1020, the input/output interface 1030, the communication interface 1040, and the bus 1050, in a specific implementation process, the device may further include other components necessary for normal operation. In addition, those skilled in the art may understand that the above device may include only components necessary for implementing the solution of the embodiments of the present specification, instead of all the components shown in the figure.

The electronic device in the above embodiment is configured to implement the corresponding remote attestation method in any one of the foregoing embodiments, and has beneficial effects of the corresponding method embodiment. Details are not described herein again.

Based on the same inventive concept, corresponding to the method in any of the above embodiments, the present disclosure further provides a non-transitory computer-readable storage medium storing computer instructions, where the computer instructions are configured to cause the computer to perform the remote attestation method according to any one of the above embodiments.

The computer-readable medium in this embodiment includes a permanent and non-permanent, and a removable and non-removable medium that can implement information storage by any method or technology. The information may be computer-readable instructions, a data structure, a program module, or other data. Examples of the computer storage medium include, but are not limited to, a phase change memory (PRAM), a static random access memory (SRAM), a dynamic random access memory (DRAM), another type of random access memory (RAM), a read-only memory (ROM), an electrically erasable programmable read-only memory (EEPROM), a flash memory, or another memory technology, a compact disc read-only memory (CD-ROM), a digital versatile disc (DVD) or another optical storage, a magnetic cassette tape, a magnetic disk storage or another magnetic storage device, or any other non-transmission medium, which can be used to store information accessible to a computing device.

The computer instructions stored in the storage medium in the above embodiment are configured to cause the computer to perform the remote attestation method according to any one of the above embodiments, which has beneficial effects of the corresponding method embodiment. Details are not described herein again.

A person of ordinary skill in the art should understand that the discussions of any of the above embodiments are exemplary only, and are not intended to imply that the scope of the present disclosure (including the claims) is limited to these examples; under the idea of the present disclosure, the technical features in the above embodiments or in different embodiments may also be combined, and the steps may be implemented in any order, and there are many other variations of different aspects of the embodiments of the present disclosure as described above, which are not provided in detail for the sake of brevity.

In addition, to simplify the description and discussion, and not to make the embodiments of the present disclosure difficult to understand, well-known power/ground connections to integrated circuit (IC) chips and other components may be shown or may not be shown in the provided figures. In addition, the apparatus may be shown in the form of a block diagram, in order to avoid making the embodiments of the present disclosure difficult to understand, and this also takes into account the fact that details of the implementation of these block diagram apparatuses are highly dependent on the platform on which the embodiments of the present disclosure are to be implemented (that is, these details should be completely within the understanding of those skilled in the art). In the case where specific details (for example, a circuit) are set forth in order to describe the exemplary embodiments of the present disclosure, it will be apparent to those skilled in the art that the embodiments of the present disclosure can be implemented without these specific details or with changes to these specific details. Therefore, these descriptions should be considered as illustrative and not restrictive.

Although the present disclosure has been described in conjunction with specific embodiments of the present disclosure, many alternatives, modifications, and variations of these embodiments will be apparent to those of ordinary skill in the art from the foregoing description. For example, other memory architectures (for example, a dynamic RAM (DRAM)) may be used in the discussed embodiments.

The embodiments of the present disclosure are intended to cover all such alternatives, modifications, and variations falling within the broad scope of the appended claims. Therefore, any omission, modification, equivalent replacement, improvement, etc. made within the spirit and principles of the embodiments of the present disclosure shall be included within the protection scope of the present disclosure.

We claim:

1. A remote attestation method, applied to a first application, wherein the first application runs in a first trusted execution environment; and the method comprises:

initiating a remote attestation request to a second application, wherein the second application runs in a second trusted execution environment;

obtaining a first attestation response returned by the second application;

obtaining a first attestation evidence of the second application from a target trusted storage module, wherein the first attestation evidence is uploaded and stored in the target trusted storage module by the second application;

performing remote attestation based on the first attestation response and the first attestation evidence, to obtain a first remote attestation result for the second application; and obtaining a first verification policy of the first application from the target trusted storage module, wherein the first verification policy is uploaded and stored in the target trusted storage module by the first application;

the first verification policy is configured for remote attestation of the first application for a further application, and the further application comprises the second application; and performing the remote attestation based on the first attestation response and the first attestation evidence comprises: verifying the first attestation response and the first attestation evidence based on the first verification policy.

2. The method according to claim 1, wherein the first attestation response comprises a first remote attestation report, and the first remote attestation report is generated based on the remote attestation request.

3. The method according to claim 2, wherein the first attestation evidence comprises reference application measurement value information of the second application, and the reference application measurement value information is generated and uploaded to the target trusted storage module based on creation or updating of the second application in the second trusted execution environment.

4. The method according to claim 3, wherein performing the remote attestation based on the first attestation response and the first attestation evidence, to obtain the first remote attestation result for the second application comprises:

determining whether the first remote attestation report meets a predetermined condition;

in response to the first remote attestation report meeting the predetermined condition, obtaining application measurement value information of the second application based on the first remote attestation report, and verifying the reference application measurement value information and the application measurement value information;

in response to the reference application measurement value information matching the application measurement value information, determining that the first remote attestation result is that attestation succeeds; and in response to the reference application measurement value information not matching the application measurement value information, determining that the first remote attestation result is that attestation fails.

5. The method according to claim 2, wherein before performing the remote attestation based on the first attestation response and the first attestation evidence, the method further comprises:

obtaining additional information in the first attestation response; and obtaining first information based on the first remote attestation report, and determining an association relationship between the first remote attestation report and the second application based on the additional information and the first information.

6. The method according to claim 1, further comprising: setting an attestation service in a smart contract of the target trusted storage module; and verifying the first attestation response and the first attestation evidence based on the first verification policy comprises:

verifying the first attestation response and the first attestation evidence based on the first verification policy by the smart contract.

7. The method according to claim 1, wherein the first attestation evidence comprises at least one of the following:

application identification information of the second application, application version information of the second application, at least one remote attestation type of the second application, or at least one piece of application measurement value information of the second application, wherein the application measurement value information is associated with the remote attestation type.

8. The method according to claim 1, wherein in response to the first remote attestation result being that attestation succeeds, the method further comprises:

generating a second attestation response and sending the second attestation response to the second application, to cause the second application to perform the following steps:

obtaining a second attestation evidence of the first application from the target trusted storage module, wherein the second attestation evidence is uploaded and stored in the target trusted storage module by the first application; and performing remote attestation based on the second attestation response and the second attestation evidence, to obtain a second remote attestation result for the first application.

9. The method according to claim 8, wherein in response to the second remote attestation result being that attestation succeeds, the method further comprises:

obtaining a public key of the second application, generating a first session key based on a private key of the first application and the public key of the second application, and communicating with the second application based on the first session key; and causing the second application to obtain a public key of the first application, generating a second session key based on a private key of the second application and the public key of the first application, and communicating with the first application based on the second session key;

wherein the first session key is the same as the second session key.

10. The method according to claim 1, further comprising:

in response to the first application and/or the second application being an open-source application, uploading and storing application code of the first application and/or the second application to a public address.

11. An electronic device, comprising a non-transitory memory, a processor, and a computer program stored on the non-transitory memory and executable on the processor, wherein the processor, when executing the program, implements operations comprising:

initiating, by a first application, a remote attestation request to a second application, wherein the second application runs in a second trusted execution environment, and the first application runs in a first trusted execution environment;

obtaining a first attestation response returned by the second application;

obtaining a first attestation evidence of the second application from a target trusted storage module, wherein the first attestation evidence is uploaded and stored in the target trusted storage module by the second application;

performing remote attestation based on the first attestation response and the first attestation evidence, to obtain a first remote attestation result for the second application; and obtaining a first verification policy of the first application from the target trusted storage module, wherein the first verification policy is uploaded and stored in the target trusted storage module by the first application;

the first verification policy is configured for remote attestation of the first application for a further application, and the further application comprises the second application; and performing the remote attestation based on the first attestation response and the first attestation evidence comprises: verifying the first attestation response and the first attestation evidence based on the first verification policy.

12. The device according to claim 11, wherein the first attestation response comprises a first remote attestation report, and the first remote attestation report is generated based on the remote attestation request.

13. The device according to claim 12, wherein the first attestation evidence comprises reference application measurement value information of the second application, and the reference application measurement value information is generated and uploaded to the target trusted storage module based on creation or updating of the second application in the second trusted execution environment.

14. The device according to claim 13, wherein performing the remote attestation based on the first attestation response and the first attestation evidence, to obtain the first remote attestation result for the second application comprises:

determining whether the first remote attestation report meets a predetermined condition;

in response to the first remote attestation report meeting the predetermined condition, obtaining application measurement value information of the second application based on the first remote attestation report, and verifying the reference application measurement value information and the application measurement value information;

in response to the reference application measurement value information matching the application measurement value information, determining that the first remote attestation result is that attestation succeeds; and in response to the reference application measurement value information not matching the application measurement value information, determining that the first remote attestation result is that attestation fails.

15. The device according to claim 12, wherein before performing the remote attestation based on the first attestation response and the first attestation evidence, the operations further comprise:

obtaining additional information in the first attestation response; and obtaining first information based on the first remote attestation report, and determining an association relationship between the first remote attestation report and the second application based on the additional information and the first information.

16. The device according to claim 11, wherein the operations further comprise:

setting an attestation service in a smart contract of the target trusted storage module; and verifying the first attestation response and the first attestation evidence based on the first verification policy comprises:

verifying the first attestation response and the first attestation evidence based on the first verification policy by the smart contract.

17. The device according to claim 11, wherein the first attestation evidence comprises at least one of the following:

application identification information of the second application, application version information of the second application, at least one remote attestation type of the second application, or at least one piece of application measurement value information of the second application, wherein the application measurement value information is associated with the remote attestation type.

18. A non-transitory computer-readable storage medium storing computer instructions, wherein the computer instructions are configured to cause a computer to execute a remote attestation method comprising:

initiating, by a first application, a remote attestation request to a second application, wherein the second application runs in a second trusted execution environment, and the first application runs in a first trusted execution environment;

obtaining a first attestation response returned by the second application;

obtaining a first attestation evidence of the second application from a target trusted storage module, wherein the first attestation evidence is uploaded and stored in the target trusted storage module by the second application;

performing remote attestation based on the first attestation response and the first attestation evidence, to obtain a first remote attestation result for the second application; and obtaining a first verification policy of the first application from the target trusted storage module, wherein the first verification policy is uploaded and stored in the target trusted storage module by the first application;

the first verification policy is configured for remote attestation of the first application for a further application, and the further application comprises the second application; and performing the remote attestation based on the first attestation response and the first attestation evidence comprises: verifying the first attestation response and the first attestation evidence based on the first verification policy.

* * * * *